United States Patent

[11] 3,578,782

[72] Inventor Takeomi Miyoshi
 Tokyo, Japan
[21] Appl. No. 872,302
[22] Filed Oct. 29, 1969
[45] Patented May 18, 1971
[73] Assignee Honda Giken Kogyo Kabushiki Kaisha
 Tokyo, Japan

[54] APPARATUS FOR THE RETRACTION OF A STEERING WHEEL OF A VEHICLE IN THE EVENT OF A FRONT END COLLISON THEREOF
11 Claims, 5 Drawing Figs.

[52] U.S. Cl. ................................................. 180/82,
 74/492, 280/87
[51] Int. Cl. ..................................................... B62d 1/18
[50] Field of Search ............................................ 74/492,
 493; 180/78; 280/87 (A)

[56] References Cited
UNITED STATES PATENTS
743,013 11/1903 Mott............................ 74/493X
3,309,103 3/1967 Newbury...................... 280/87

Primary Examiner—Milton Kaufman
Attorney—Waters, Roditi, Schwartz and Nissen

ABSTRACT: A steering wheel is connected to a shaft which in turn is connected to a steering mechanism in a housing so as to provide a steering connection, the housing being supported on a support frame which extends forwardly from the car body frame and is connected therewith along an inclined surface so that if the support frame is displaced rearwardly in the event of front end collision, the support frame is lowered where it is connected with the housing to cause the latter to be lowered and in turn cause the steering shaft to be retracted from the passenger compartment. The support frame may also be provided with a downwardly bent portion to achieve lowering of the housing and retraction of the shaft and steering wheel.

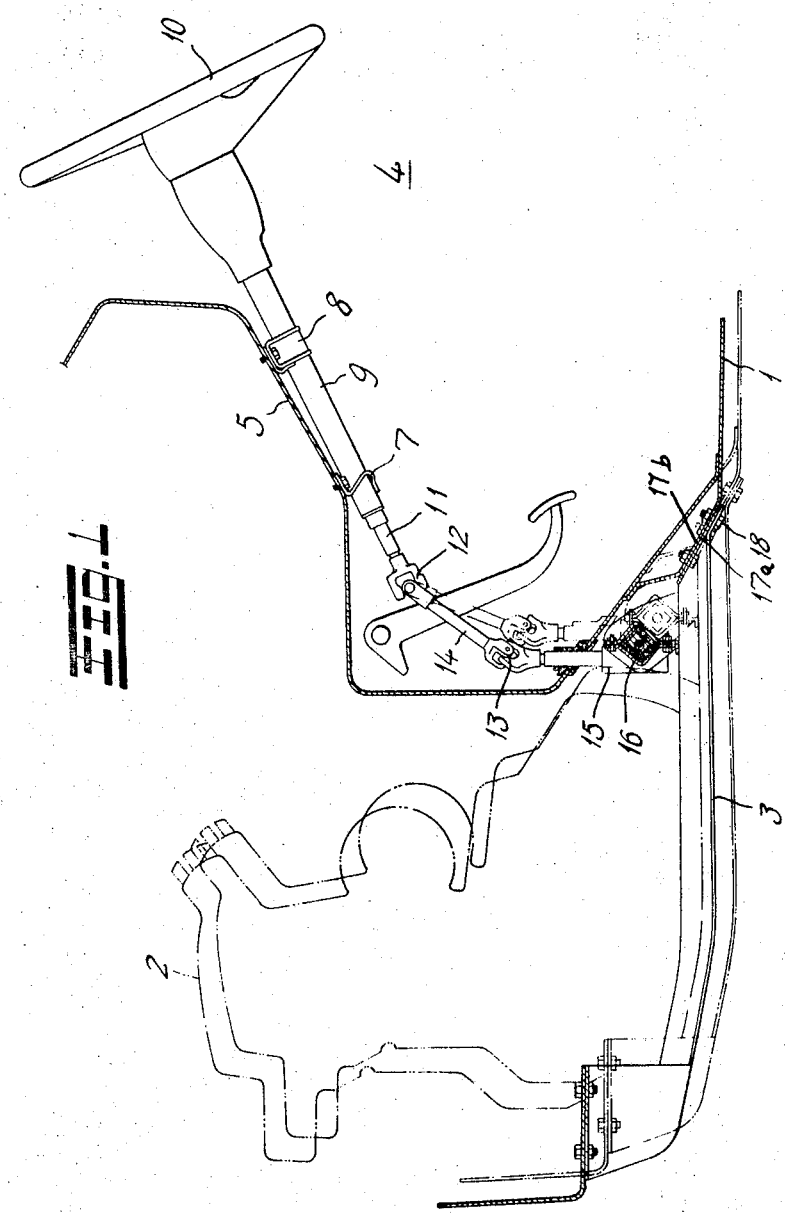

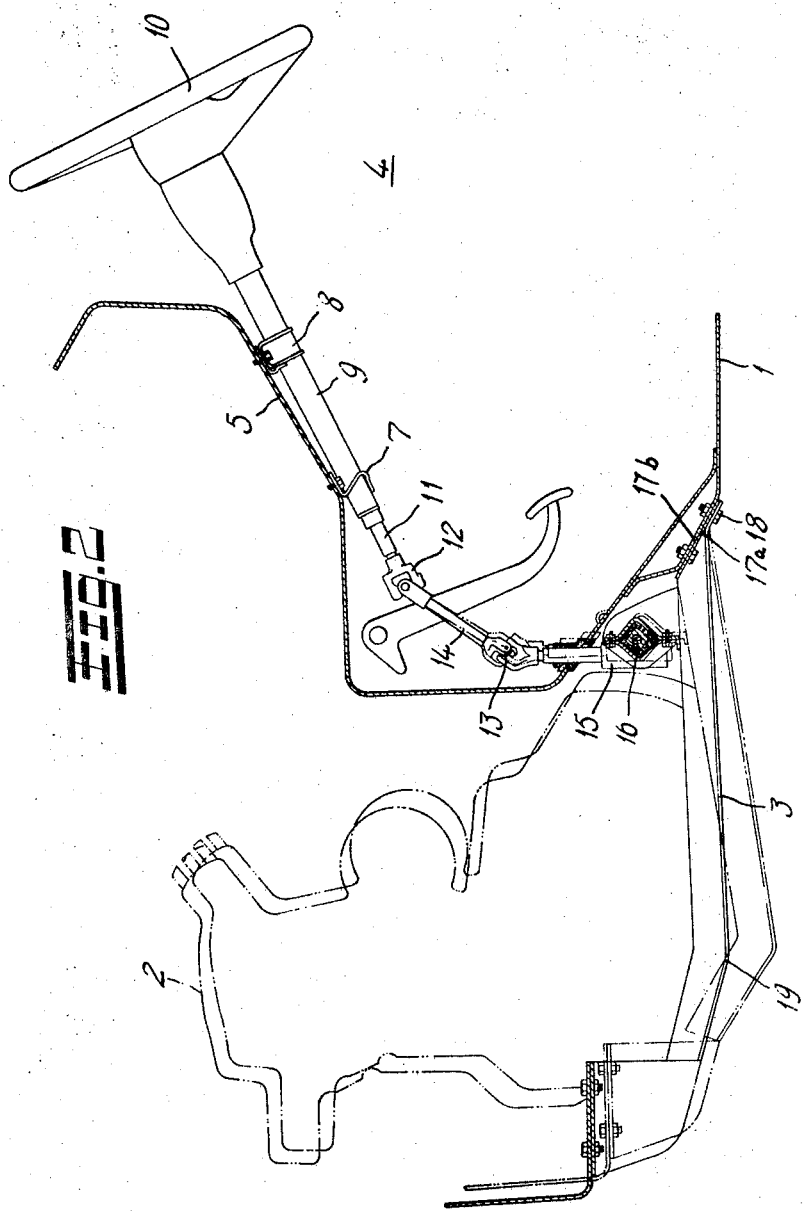

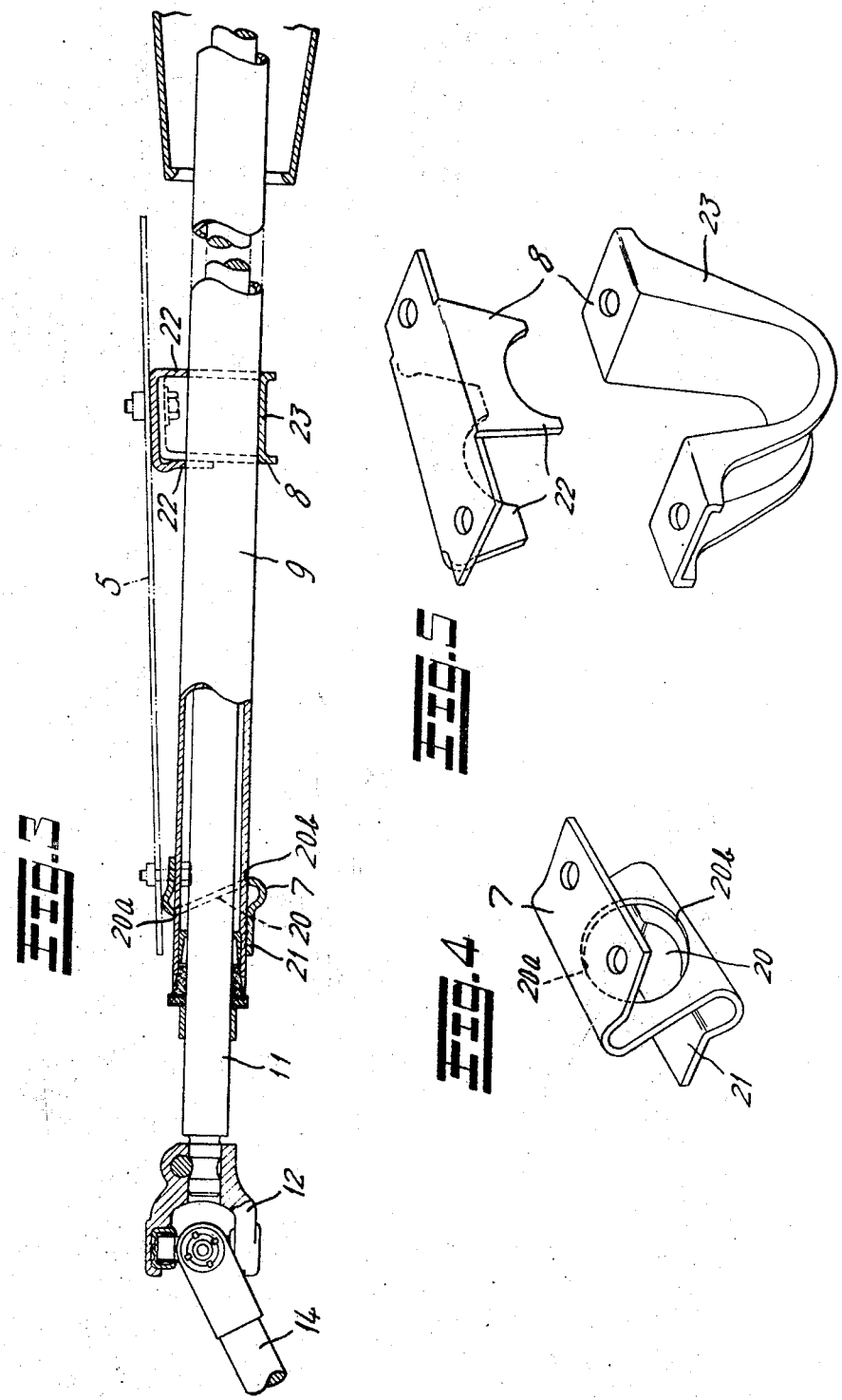

3,578,782

APPARATUS FOR THE RETRACTION OF A STEERING WHEEL OF A VEHICLE IN THE EVENT OF A FRONT END COLLISON THEREOF

BRIEF SUMMARY OF THE INVENTION

The invention relates to steering apparatus of a vehicle in which the steering wheel of the steering apparatus undergoes retractive movement from a passenger compartment upon front end collision of the vehicle. As a consequence, the danger of injury caused by impact of the driver with the steering wheel is substantially lessened.

According to the invention, the apparatus comprises a steering gear box connected through a link to the lower end of a steering shaft having a steering wheel attached thereto, the gear box being mounted on a supporting frame projecting forward from the body frame of the vehicle, the supporting frame being so constructed that it will deflect downwards upon application thereto of a high external force from the front. As a consequence, the gear box will be lowered causing retractive movement of the steering shaft and wheel. According to the invention, the rear end of the supporting frame and the front end of the body frame are secured to one another at a rearwardly and downwardly inclined surface and are connected together by means of bolts or the like, so that by application of a large external force on the support frame from the front thereof, the supporting frame will be moved downwardly at the rear end thereof. The supporting frame can be formed with a downwardly bent portion to promote the downward movement.

In further accordance with the invention, the column in which the steering shaft is rotatably supported, is mounted from the body frame by means of a support member which resists projective movement of the steering shaft into the passenger compartment while permitting retractive movement of the steering shaft.

BRIEF DESCRIPTION OF THE DRAWING

FIG. 1 is a side view, partly in section, of one embodiment of this invention,

FIG. 2 is a side view, partly in section, of a modified embodiment of this invention, FIG. 3 is an enlarged side view, partly in section, of a steering column portion, FIG. 4 is a perspective view of a front supporting member of the steering column, and FIG. 5 is an exploded perspective view of a rear supporting member of the steering column.

DETAILED DESCRIPTION

Referring to FIG. 1 of the drawing, numeral 1 denotes the frame of a car body, from which a supporting frame 3 projects forwardly and supports an internal combustion engine 2. Numeral 4 denotes a passenger compartment formed above the car body frame 1, and numeral 5 denotes a wall of the car body at the front of the passenger compartment. A steering column 9 is attached to the wall 5 by means of front and rear supporting members 7 and 8 respectively. A steering shaft 11, with a steering wheel 10 thereon is rotatably mounted in the steering column 9 and is held in axial position therein. A link 14 is connected by universal joints 12 and 13 respectively to shaft 11 and to a steering mechanism in a steering gear housing 15 (steering gear box) whereby torque can be transmitted between wheel 10 and the mechanism in the housing 15 so that turning of the vehicle can be effected by turning wheel 10. The housing 15 is attached through a rubber mount 16 to the upper surface of the rear end portion of the foregoing supporting frame 3.

The supporting frame 3 is so constructed that upon the application of a large external force thereon, from the front, at the time of a collision, at least a portion of the frame 3 to which the steering gear housing 15 is attached will deflect downwards, as for example, shown in chain dotted outline in FIGS. 1 and 2. Namely, as shown in FIG. 1, the rear end of the supporting frame 3 and the front end of the body frame 1 are provided with respective inclined end portions 17a, 17b placed one upon the other and connected together by means of fastener means 18 such as bolts, so that upon application of large external force on frame 3 from the front thereof, the supporting frame 3 will deflect downward, at its rear end portion, i.e., at its attachment with the gear housing 15, in accordance with the inclined support of frame 3. In FIG. 2, the supporting frame 3 has a downwardly bent portion 19 in front of its attachment with the steering gear housing 15, so that upon application of large external force on frame 3 from the front, said bent portion 19 may bend and close whereby the rear portion, that is, the portion where frame 3 is connected to the steering gear housing 15 will be given a downward movement. By such a downward movement of the steering gear housing 15, the steering shaft 11 connected thereto through the link 14 and the steering wheel 10 at the top end thereof are moved in a forward direction (retractive movement from the passenger compartment), so that projection thereof into the passenger compartment can be prevented.

There is a danger in this operation, that the column 9 may undergo a pushing force tending to move it further into the passenger compartment and carry the steering shaft and wheel 10 therewith which serves as an obstacle upon which the driver can be hurled in the event of an accident. Accordingly, it is desirable that the column 9 be so constructed that it is not movable into the passenger compartment but is freely movable in a retraction direction to soften any impact of the driver with the steering wheel. For satisfying this requirement, the front side supporting member 7 is constructed as a single metallic member 21 having an opening 20 for receiving the steering column 9 and bent to S-shape as shown in FIG. 4. The member 21 is secured at one end to the wall 5 and at its other end to the column 9 so that normally the column 9 is held by clamping action between upper and lower edges 20a and 20b of the opening 20 which is disposed in a web inclined in relation to the axis of the column 9 inserted therethrough. If, accordingly, from this condition the column 9 is displaced to the right in the drawing, the inclination of the opening 20 tends to further increase and thereby the clamping by the upper and lower edges 20a and 20b is further increased, but if the column 9 is displaced to the left in the drawing, the inclination of the opening 20 tends to decrease and thereby the axial spacing of the upper and lower edges 20a and 20b tends to increase, whereby the clamping force on the column 9 is decreased allowing movement thereof. The supporting member 8 comprises, as clearly shown in FIG. 5, a pair of front and rear claw pieces 22 made of a metallic plate and an outer band 23 also made of a metallic plate.

In the apparatus according to the invention, when the supporting frame at the front of the car body is subjected to a large external force as for example upon a collision of the car, the frame is displaced downward causing the steering gear housing 15 to displace downwards, so that the steering shaft and the steering wheel connected to the gear housing are forced to move toward the front and thus are prevented from projecting rearward to injure the driver as in conventional arrangements. To insure downward movement of the supporting frame 3 at the rear portion thereof, the frame 3 may be formed with the bent portion 19 as shown in FIG. 2. Additionally, the steering column is supported so as to be movable frontwards so that if the driver is thrust against the steering wheel, it will yield and the impact force of the driver against the wheel will be lessened.

I claim:

1. Steering apparatus for a vehicle having a body frame, said apparatus comprising a steering shaft, a steering wheel on said shaft positioned in a passenger compartment of the vehicle, a link connected to said shaft, a housing with a steering mechanism coupled to said link to provide steering connection with said wheel, and means supporting said housing to displace the same and cause retractive movement of the steering shaft and wheel in said passenger compartment upon application to said means of a large rearwardly directed external force caused by front end collision of the vehicle.

2. Apparatus as claimed in claim 1 wherein said means comprises a support frame connected to said body frame and extending forwardly thereof.

3. Apparatus as claimed in claim 2 comprising means connecting said support frame and body frame along a surface which is inclined with respect to said support frame.

4. Apparatus as claimed in claim 3 wherein said housing surmounts said support frame and said surface is inclined rearwardly and downwardly to cause the support frame and housing to be lowered upon application of rearward force to said support frame, said shaft undergoing retractive movement upon lowering of said housing.

5. Apparatus as claimed in claim 4 wherein said support frame is connected at the rear end thereof to the body frame at the front end thereof along said inclined surface, said apparatus comprising fastener means connecting said ends of the frame along said inclined surface.

6. Apparatus as claimed in claim 2 wherein said support frame includes a bent portion to produce displacement of the housing and consequent retractive movement of the shaft upon application of said rearward force to said support frame.

7. Apparatus as claimed in claim 2 wherein said housing surmounts said support frame, said bent portion being located forwardly of the position wherein the housing is on the support frame, said bent portion being downwardly bent.

8. Apparatus as claimed in claim 2 wherein said vehicle has an engine, and said support frame supports said engine.

9. Apparatus as claimed in claim 1 comprising a steering column rotatably supporting said shaft, and means connecting said column from said body frame to permit retractive movement thereof while resisting projective movement into said passenger compartment.

10. Apparatus as claimed in claim 9 wherein said means connecting said column from said body frame comprises a supporting member of S-shape with opposite flanges connected respectively to said column and said body frame, said supporting member including an inclined web between said flanges with an opening in which said column is engageably received such that the supporting member resists displacement of the column in the projective direction while permitting displacement in the opposite retractive direction.

11. Apparatus as claimed in claim 10 wherein said link includes opposite ends with universal connections, said supporting member being located at a forward position on said column, said means connecting said column from said body frame further comprising a second support between the column and the body frame at a rear position on said column.